United States Patent [19]

Müller et al.

[11] 3,953,570
[45] Apr. 27, 1976

[54] PROCESS FOR THE TREATMENT OF CARBURIZING SALT WASTES

[75] Inventors: Wolfgang Müller, Mannheim-Rheinau; Lothar Witzke, Bruhl, both of Germany

[73] Assignee: Th. Goldschmidt AG, Germany

[22] Filed: Dec. 30, 1974

[21] Appl. No.: 537,448

[30] Foreign Application Priority Data
Jan. 4, 1974 Germany............................ 2400318

[52] U.S. Cl.................................. 423/155; 23/303; 423/160; 423/165; 423/430
[51] Int. Cl.$^2$............................................ C01F 1/00
[58] Field of Search ........... 423/165, 162, 422, 430, 423/160, 499, 186, 184, 155; 23/303; 75/99

[56] References Cited
UNITED STATES PATENTS

| | | | |
|---|---|---|---|
| 1,346,624 | 7/1920 | Wood .................................. | 23/303 |
| 1,506,946 | 9/1924 | Schilling .............................. | 23/303 |
| 3,847,597 | 11/1974 | Mueller et al. ...................... | 423/430 |

FOREIGN PATENTS OR APPLICATIONS

| | | | |
|---|---|---|---|
| 218,460 | 7/1957 | Australia............................ | 423/162 |
| 523,667 | 7/1940 | United Kingdom................. | 423/165 |
| 237,131 | 8/1969 | Japan.................................. | 423/165 |

*Primary Examiner*—Oscar R. Vertiz
*Assistant Examiner*—Wayne A. Langel
*Attorney, Agent, or Firm*—James E. Bryan

[57] ABSTRACT

This invention relates to a process for the treatment of the reaction mass produced during the joint elimination of barium-containing nitrite-/nitrate-bearing carburizing salt wastes and cyanide-/cyanate-bearing wastes by ignition of the dry mixture at elevated temperatures, comprising suspending the reaction mass in water and either a. neutralizing the alkaline suspension obtained with concentrated nitric acid to a pH value of 6, the feed velocity of the acid and conditions of agitation being so selected that the pH value of the suspension will at no time fall below pH 6, and separating the barium carbonate, or b. freeing the alkaline suspension obtained from barium carbonate, and neutralizing the filtrate with concentrated nitric acid to a pH value of 7.2, the feed velocity of the acid and conditions of agitation being so selected that the pH value of the suspension will at no time fall below pH 7.2, and separating the precipitated sodium bicarbonate, concentrating the clear solutions obtained according to (a) or (b) to a water content of 10 – 20% by weight, separating precipitated sodium chloride, and evaporating the residual solution to dryness.

2 Claims, No Drawings

PROCESS FOR THE TREATMENT OF CARBURIZING SALT WASTES

The present invention relates to a process for the treatment of the reaction mass which is produced during the joint elimination of barium-containing nitrite-/nitrate-bearing carburizing salt wastes and cyanide-/cyanate-bearing wastes by ignition of the dry mixture at elevated temperatures.

Known in the art from German Pat. No. 2,234,171, is a process for the joint elimination and/or treatment of possibly barium-containing carburizing salt wastes based on nitrite-/nitrate-bearing wastes, on the one hand, and cyanide-/cyanate-bearing wastes, on the other hand, by oxidation of the cyanide/cyanate by nitrite/nitrate. In this process oxidation of the cyanide-/cyanate-bearing constituent of the carburizing salt wastes with the nitrite-/nitrate-bearing constituent of the carburizing salt wastes takes place at an excess by ignition of the dry mixture at temperatures above 150°C, and the resulting barium carbonate-containing mixture is then leached out with water.

If, according to the process of this patent, an elimination rather than a treatment of the barium salt-containing carburizing salt residues is sought, one adds, prior to the thermal reaction, an amount - corresponding to the barium constituent - of a sulfate of calcium, sodium, or iron. After the thermal reaction, a brittle reaction mass has formed which can be discarded as a non-toxic, neutral salt-containing refuse, (main constituent barium sulfate). If, in the process, one works without sulfate addition, the reaction mass contains barium carbonate as the main constituent. When this mixture is leached out with water, the soluble constituents, such as sodium carbonate, potassium chloride and sodium chloride, are dissolved. After filtration of the barium carbonate sludge, the strongly alkaline filtrate obtained is disposed of as waste water, after neutralization with sulfuric acid.

It now has been found in the meantime in actual practice that, depending upon the mode of the process (with or without addition of sulfate), either the waste water - because of the dissolved salts when proceeding without sulfate addition, or the environment - because of the corresponding special refuse load (after addition of sulfate) are affected to a significant degree.

In order to now obtain re-usable salts, after the thermal reaction of the cyanide-/cyanate-bearing mixture with the nitrite-/nitrate-bearing mixture (which was carried out without sulfate addition in order that no insoluble waste products and/or end products be obtained, and in order to considerably reduce the salt content of the waste water), one proceeds in such a manner, according to the present invention, that the reaction mass is suspended in water, and the alkaline suspension obtained is a. either neutralized with concentrated nitric acid to a pH value of 6, whereby the flow velocity of the acid and the stirring conditions are so chosen that the pH value of the suspension will not fall below pH 6, and the suspension is then filtered in order to separate the barium carbonate, b. or freed from barium carbonate by filtration, and the filtrate is neutralized with concentrated nitric acid to a pH value of 7.2, whereby the flow velocity of the acid and the stirring conditions are so chosen that the pH value of the suspension will not fall below pH 7.2, and the precipitated sodium bicarbonate is thereafter separated, whereupon the clear solutions obtained according to (a) or (b) are concentrated to a water content of 10 – 20% by weight; the sodium chloride precipitated thereby is separated, preferably at a temperature in the range of 70° – 100°C, and the residual solution is evaporated to dryness, at which time a directly reusable tempering salt is produced.

In the inventive process, the cyanide-/cyanate-free reaction mass is thus leached out with water after the thermal reaction has been carried out. Obtained thereby is a sludge which contains, as an undissolved main constituent, barium carbonate as well as, as a dissolved constituent, mainly sodium chloride, alkali carbonate, and alkali-nitrite/nitrate. In a neutralization reactor which is equipped with a high-speed turbomixer and a metering apparatus for the nitric acid, the strongly alkaline final liquor is then neutralized with concentrated nitric acid to a pH value of 6. The nitrate formed thereby thus enables one to eliminate an alkali nitrate addition otherwise necessary for obtaining a low-melting point tempering salt end product.

Of great importance in this process step is, on the one hand, the metering velocity of the nitric acid and, on the other hand, the rapid intermixing of the reactants by vigorous stirring. A local over-acidification is thereby prevented, and the formation of nitrous gases is thus counteracted. After the completed neutralization, the undissolved portion (mainly barium carbonate) is separated from the salt solution by decantation and filtration. The washed reaction residue (barium carbonate) is well suited for the preparation of barium chloride.

It is also possible, however, according to the present invention, to proceed in a manner such that, prior to the neutralization with the nitric acid, the suspension is freed from insoluble barium carbonate and the clear solution is then neutralized with the nitric acid to a pH value of 7.2. The reaction conditions are the same as have been indicated in the preceding paragraph. The sodium bicarbonate which precipitates at the pH value of 7.2 is filtered off.

The recovery of the sodium bicarbonate precipitated as a result of this reaction is carried out in order that one does not have to convert the entire alkali carbonate constituent into non-usable carbon dioxide, and in order to form less nitrate than is the case under (a) above, if such should be necessary in view of the $NO_3$-$NO_2$-equilibrium in the tempering salt reclaimed product. Instead, the precipitated sodium bicarbonate may be further utilized economically.

The chloride-containing nitrite-/nitrate filtrate obtained according to (a) or (b) contains 50 to 60% by weight of water and is then concentrated for the purpose of separating the chloride constituent in a crystallizing evaporator to a water content in the range of 10 to 20% by weight. The concentrate containing less than 1.5% by weight of chloride is thereafter evaporated, in a thin-layer evaporator, to a water-free melt which solidifies on a cooling bath and is scaled off.

A further advantage resides in the fact that the chloride portion separated only as sodium chloride influences equally favorably the sodium-potassium equilibrium in the tempering salt reclaimed product since the entire wastes contain relatively more sodium than is desirable in the low-melting tempering salt.

When this inventive process was actually carried out, it was found that another process step of the abovementioned patent also may be deleted. namely that in which the nitrite-/nitrate-bearing residues are melted down, and a main portion of this nitrite-/nitrate-bearing melt is separated by filtration and must be subjected to a separate treatment. As a result thereof, it was effectively prevented that too much excess nitrite/nitrate was fed to the thermal oxidation reaction which had to be reduced by additions of coke.

This step is now no longer necessary since the excess nitrite/nitrate is obtained in reusable form, according to the novel process mode of operation, and in the wet state at the end of the inventive process, together with the nitrate additionally produced due to the neutralization reaction. This mode of operation is enhanced by the fact that during the detoxification reaction with a nitrite-/nitrate excess, nitrate is preferentially consumed.

The alkali-nitrite/nitrates obtained can at once be employed again as usable tempering salts in salt hardening rooms.

The inventive process will now be further described hereinafter on the basis of the followng examples:

EXAMPLE 1

9.65 parts by weight of cyanide-/cyanate-free reaction product from the detoxification reaction carried out between cyanide-/cyanate-bearing hardening room salt wastes and nitrite-/nitrate-bearing hardening room salt wastes are introduced, still hot, into 10 parts by weight of water while stirring. Obtained thereby is a sludge which contains 2.9 parts by weight of barium carbonate and 0.4 part by weight of other undissolved substances, as well as 2.7 parts by weight of sodium chloride, 1.4 parts by weight of alkali carbonate, and 2.25 parts by weight of dissolved alkali-nitrite/nitrate.

Introduced into this suspension at 50°C and while stirring vigorously with a turbomixer during 3 hours are 2.2 parts by weight of concentrated nitric acid. At that time, the nitric acid is metered into the suction zone of the stirrer in a fine spray in order to avoid any over-acidification. The pH value of the solution changes thereby from an initial 9.5 to 6.0. During the entire neutralization operation, no red nitric oxide vapors are noticeable. After the neutralization, the undissolved portion (main constituent barium carbonate) flocculates out rapidly and is separated from the salt solution by decanting and filtering.

The clear chloride-containing nitrite-/nitrate solution obtained contains approximately 60% by weight of water and, for purposes of separation of the chloride, is concentrated in a vacuum evaporator at 90°C and 250 Torr to 14% by weight of water. At that time, the main amount of the chloride crystallizes out as sodium chloride, whereas the alkali-nitrite/nitrate remains completely dissolved at 90°C and is separated by centrifuging. The sodium chloride which is rewashed with saturated sodium chloride and a little water contains thereafter still less than 0.01% nitrogen from $NO_2-$ and $NO_3-$ as well as more than 98% by weight of sodium chloride.

The nitrite-/nitrate-bearing solids are stirred to complete water removal under vacuum at 80° to 90°C. Obtained thereby ultimately are 4.30 parts by weight of crystalline water-free alkali-nitrite/nitrate powder containing 1.4% by weight chloride. This product forms at 160°C a clear melt and is thus directly usable as tempering salt.

EXAMPLE 2

8.4 parts by weight of cyanide-/cyanate-free reaction product from the detoxification reaction carried out between cyanide-/cyanate-bearing hardening room salt wastes and nitrite-/nitrate-bearing hardening room salt wastes are treated with 8 parts by weight of water as in Example 1. The sludge contains 2.4 parts by weight barium carbonate, 0.35 part by weight of other insoluble substances, 2.1 parts by weight of dissolved sodium chloride, 1.2 parts by weight of alkali carbonate, partially dissolved, and 2.35 parts by weight of dissolved alkali-nitrite/nitrate. The undissolved part which contains the entire quantity of barium carbonate is separated by decantation, filtration and washing.

The alkaline washing water is combined with the filtrate which is now reacted while undergoing an intensive thorough blending with 1.0 part by weight of concentrated nitric acid to a pH value of 7.2 for purposes of the conversion of the entire alkali carbonate amount to the bicarbonate. After the separation of the relatively insoluble sodium bicarbonate, precipitated in an amount of 1.7 parts by weight, there follows a concentration of the solution to a water content of 15% by weight. Evaporation takes place under vacuum so that the boiling point will be at a temperature in the range of 90° to 100°C, which suffices to maintain all the nitrite and nitrate in solution. After the completed salting-out, the salt paste is centrifuged and the wet solids further evaporated under vacuum as described in Example 1. Obtained in this manner are 2.75 parts by weight of an alkali-nitrite/nitrate salt, containing 1.4% by weight of chlorine, which forms a clear melt at 160°C.

It will be obvious to those skilled in the art that many modifications may be made within the scope of the present invention without departing from the spirit thereof, and the invention includes all such modifications.

We claim:
1. A process for the treatment of the reaction mass produced by igniting a dry mixture of barium-containing nitrite-/nitrate-bearing carburizing salt wastes and cyanide-/cyanate-bearing wastes at temperatures above about 150°C, comprising suspending the reaction mass in water to obtain a suspension containing sodium chloride, alkali carbonate, and alkali nitrite/nitrate as dissolved constituents, and barium carbonate as an undissolved constituent, neutralizizng the alkaline suspension obtained with concentrated nitric acid to a pH value of 6, the feed velocity of the acid and conditions of agitation being so selected that the pH value of the suspension will at no time fall below pH 6, separating the flocculated barium carbonate, concentrating the clear solution obtained to a water content of 10 – °% by weight to precipitate sodium chloride, separating the sodium chloride, and evaporating the residual solution to dryness.

2. A process according to claim 1 in which the precipitated sodium chloride is separated at a temperature in the range of about 70° – 100°C.

* * * * *

UNITED STATES PATENT AND TRADEMARK OFFICE
CERTIFICATE OF CORRECTION

PATENT NO. : 3,953,570
DATED : April 27, 1976
INVENTOR(S) : Wolfgang Müller and Lothar Witzke It is certified that error appears in the above-identified patent and that said Letters Patent are hereby corrected as shown below:

Column 4, line 58, "10 - 0%" should read

- - - 10 - 20% - - -.

Signed and Sealed this twenty-second Day of June 1976

[SEAL]

Attest:

RUTH C. MASON
*Attesting Officer*

C. MARSHALL DANN
*Commissioner of Patents and Trademarks*